(12) United States Patent
Horoszczak et al.

(10) Patent No.: US 11,280,554 B2
(45) Date of Patent: Mar. 22, 2022

(54) FRACTAL HEAT EXCHANGER WITH BYPASS

(71) Applicant: Hamilton Sundstrand Corporation, Charlotte, NC (US)

(72) Inventors: Adam Horoszczak, Wroclaw (PL); Piotr Sawicki, Bogdaniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/147,817

(22) Filed: Jan. 13, 2021

(65) Prior Publication Data
US 2021/0231381 A1 Jul. 29, 2021

(30) Foreign Application Priority Data
Jan. 24, 2020 (EP) .................................... 20153726

(51) Int. Cl.
| F28D 7/16 | (2006.01) |
| F28F 7/02 | (2006.01) |
| F28F 9/02 | (2006.01) |

(52) U.S. Cl.
CPC .............. *F28D 7/1661* (2013.01); *F28F 7/02* (2013.01); *F28F 9/0275* (2013.01)

(58) Field of Classification Search
CPC .. F28D 7/1661; F28D 7/16; F28D 2021/0021; F28D 7/0016; F28D 7/0008; F28F 9/0275; F28F 7/02; F28F 13/08; F28F 9/0273
See application file for complete search history.

(56) References Cited

U.S. PATENT DOCUMENTS

| 10,041,745 | B2 * | 8/2018 | Poltorak | .................. F28F 1/40 |
| 10,088,250 | B2 * | 10/2018 | Turney | ..................... F28F 1/06 |
| 10,107,555 | B1 * | 10/2018 | Miller | ........................ F28D 7/16 |
| 10,267,515 | B2 * | 4/2019 | Adriany | .................... F02K 9/52 |

(Continued)

FOREIGN PATENT DOCUMENTS

| DE | 202019102083 U1 | 4/2019 |
| WO | 2019171078 A1 | 9/2019 |
| WO | 2020109707 A1 | 6/2020 |

OTHER PUBLICATIONS

European Search Report for Application No. 20153726.3 dated Jul. 20, 2020, 7 pages.

*Primary Examiner* — Jon T. Schermerhorn, Jr.
(74) *Attorney, Agent, or Firm* — Cantor Colburn LLP

(57) ABSTRACT

A heat exchanger comprises: a plurality of first fluid channels defining a flow path for a first fluid; a first fractal channel for conveying the first fluid to the plurality of first fluid channels; and a second fractal channel for conveying the first fluid from the plurality of first fluid channels; wherein the first fractal channel and the second fractal channel each comprises at least one divergence point along its length where a parent channel splits into a plurality of sub-channels which diverge away from each other, and wherein one or each of the first fractal channel and the second fractal channel defines one or more through-channels for a second fluid to pass through the respective fractal channel, each through-channel extending from a parent channel side of a divergence point and emerging between the corresponding sub-channels on a sub-channel side of the divergence point.

15 Claims, 7 Drawing Sheets

(56) References Cited

U.S. PATENT DOCUMENTS

| | | | |
|---|---|---|---|
| 10,995,996 B2* | 5/2021 | Erno | F28F 7/02 |
| 2009/0274549 A1* | 11/2009 | Mitchell | F01D 5/186 |
| | | | 415/115 |
| 2013/0206374 A1* | 8/2013 | Roisin | F28D 7/0041 |
| | | | 165/165 |
| 2017/0030651 A1 | 2/2017 | Rock, Jr. et al. | |
| 2017/0248372 A1 | 8/2017 | Erno et al. | |
| 2019/0021186 A1 | 1/2019 | Poltorak | |
| 2019/0024988 A1 | 1/2019 | Wilson et al. | |
| 2019/0086154 A1 | 3/2019 | Adriany et al. | |

* cited by examiner

FRACTAL HEAT EXCHANGER WITH BYPASS

FOREIGN PRIORITY

This application claims priority to European Patent Application No. 20153726.3 filed Jan. 24, 2020, the entire contents of which is incorporated herein by reference.

TECHNICAL FIELD

The invention relates to a heat exchanger and to a method of manufacturing a heat exchanger.

BACKGROUND

Heat exchangers for transfer of heat between different fluids are very widely used and exist in various forms. Typically heat exchangers are arranged for flow of a primary fluid and a secondary fluid with heat being transferred between the two fluids as they flow through the device. Multi-stream heat exchangers for exchanging heat between more than two fluids also exist in the prior art. Heat exchangers are required within aircraft structures to regulate temperatures of working fluids as well as to scavenge heat from one system for use in another. Every heat exchanger consumes significant space within an aircraft structure, in certain areas of the aircraft structure space is at a premium and it is therefore desirable to optimise the size of each component to fit them together in a way that minimises the space taken, while also maintaining sufficient levels of heat transfer.

Some heat exchangers have a layered structure with a large number of parallel flow paths between plates that separate the flow paths. There may be 50-200 plates, or more, in this type of heat exchanger, typically with alternating hot/cold fluid flow paths either side of each plate. Such heat exchangers can also be referred to as laminate heat exchangers.

In laminate heat exchangers, the flow paths will typically be square or rectangular in cross-section meaning that there is very limited primary heat transfer surface area. In circumstances where the entire space between two adjacent plated forms the flow path, the primary heat transfer surface is only the top and bottom surface. There is therefore a desire to provide heat exchanger cores with increased primary transfer surfaces.

Another type of heat exchanger uses a tube bank, where the hot fluid passes through a plurality of small-diameter parallel tubes that are exposed to a cooling fluid. This increases the primary heat transfer surface as compared to a laminate heat exchanger. However, supplying the hot fluid to the plurality of tubes requires complex inlet and outlet headers. These significantly increase the weight and size of the overall heat exchanger which can lead to a reduction in working efficiency.

There is therefore a need to provide a heat exchanger with an improved design.

SUMMARY OF INVENTION

Viewed from a first aspect, the present disclosure provides a heat exchanger comprising: a plurality of first fluid channels and defining a flow path for a first fluid; a first fractal channel for conveying the first fluid to the plurality of first fluid channels; and a second fractal channel for conveying the first fluid from the plurality of first fluid channels; wherein the first fractal channel and the second fractal channel each comprises at least one divergence point along its length where a parent channel splits into a plurality of sub-channels which diverge away from each other, and wherein one or each of the first fractal channel and the second fractal channel defines one or more through-channels for a second fluid to pass through the respective fractal channel, each through-channel extending from a parent channel side of a divergence point and emerging between the corresponding sub-channels on a sub-channel side of the divergence point.

This combines the use of a fractal channel with a heat exchanger section comprising a plurality of channels fed by each sub-channel of the fractal channel. The use of a fractal channel allows fluids to be distributed between a large number of close-packed first and second fluid channels, giving a large heat transfer surface to maximise heat transfer efficiency within a compact volume.

The fractal channels can be manufactured by additive manufacturing, however typically additional support structures are required at the divergence points. The additional through-channels at the point of the divergence point mean that every surface of the fractal channel is fully supported, thus improving the printability of the heat exchanger.

The through-pass channels are further advantageous as they allow the second fluid to pass through which provides additional surface area for heat transfer to take place between the first and second fluid. Thus the overall heat transfer efficiency of the heat exchanger is improved.

Additionally, the through-passes improve the overall flow of the second fluid as without the through-passes the second flow would be more significantly disrupted by the fractal channels. By providing through-pass channels within the fractal channels, the second flow is able to smoothly flow through, thus improving heat transfer further.

The heat exchanger may further comprise an outer wall defining a second fluid inlet and a second fluid outlet for a second fluid to flow through the second fluid channels, wherein the fluid inlet and the fluid outlet are axially aligned with each other along a longitudinal axis of the heat exchanger.

The outer wall may have a circular cross section, alternatively the outer wall may have a square or irregular cross section. This allows the outer wall to resemble a duct and can therefore replace part of a duct carrying a second fluid, for example. By positioning the heat exchanger within a duct the heat exchanger can fit within a relatively confined space. In particular this heat exchanger can be placed in the area where a duct is normally present. This eliminates the need for additional space to mount a conventional plate-fin heat exchanger with ducts connected to the second fluid inlet and outlet. The use of fractal channels further reduces the need for large headers which will also help to save space.

The heat exchanger may further comprise a heat exchanger core including the plurality of first fluid channels and a plurality of second fluid channels defining a flow path for a second fluid.

Alternatively, the cross-sectional shape may be varied along the length of the heat exchanger. For example, at the section with the first and second fractal channel, the outer wall cross section may be circular, and at the section with the heat exchanger core the outer wall cross section may be rectangular.

By positioning the first fractal channel and the second fractal channel within said duct, the fractal channels also take part in the heat transfer as the second fluid surrounds the fractal channels. This means that heat transfer will take place along the entire length of the fluid flow path, from the first fractal channel, through the heat exchanger core and to the second fractal channel. Thus, the heat transfer efficiency will be increased compared to conventional heat exchanger cores.

The diameter of the outer wall may be constant along the length of the heat exchanger. Alternatively, the diameter of the outer wall may vary along the length of the heat exchanger core. Additionally, the duct formed by the outer wall may be straight or curved. This will depend on the space requirements within the overall system and allows the heat exchanger to be adapted as required.

Each through-pass channel may be axially aligned with at least a portion of the parent channel. This aids in improving the flow characteristics for the second fluid.

The heat exchanger may further comprise a first fluid inlet conduit connected to the first fractal channel and a first fluid outlet conduit connected to the second fractal channel. The fluid inlet and outlet conduits may both extend through the outer wall.

The first fluid inlet conduit and the first fluid outlet conduit may be at an angle of between 45 and 90 degrees with respect to a longitudinal axis of the heat exchanger. The longitudinal axis of the heat exchanger may correspond to a longitudinal direction of the plurality of first fluid channels and/or to a longitudinal direction of a body of the heat exchanger.

The first fluid inlet conduit may be at the same end of the duct as the second fluid outlet, and the first fluid outlet conduit may be at the same end of the duct as the second fluid inlet. Alternatively, the second fluid inlet may be at the same end of the duct as the first fluid inlet conduit and the second fluid outlet may be at the same end of the duct as the first fluid outlet conduit.

The first fluid may be the "hot flow" and the second fluid may be the "cold flow". Alternatively, the first fluid may be the "cold flow" and the second fluid may be the "hot flow".

The plurality of first fluid channels may comprise a plurality of discrete tubes, which may each be directly connected to the first fractal channel and the second fractal channel. Each tube may extend between a sub-channel of the first fractal channel and a sub-channel of the second fractal channel. The second fluid may be free to travel around the plurality of separate tubes containing the first fluid. By allowing the tubes containing the first fluid to be fully submerged within the second fluid, the heat transfer is increased.

In use the first fluid and the second fluid may travel in opposite direction in a counter-flow arrangement. A counter-flow arrangement reduces the thermal stresses in the materials as the temperature difference between the first and second fluid at any point along the flow path will be reduced. This is particularly beneficial if the separate tubes had a small diameter or thin wall.

Alternatively, the first fluid and the second fluid may travel in the same direction in a parallel-flow arrangement.

As a further alternative, the flow of the second fluid may be perpendicular to the flow of the first fluid within the heat tubes of the heat exchanger core in a cross-flow arrangement.

The heat exchanger core may comprise a homogeneous block of material having a plurality of bores extending therethrough defining the plurality of first and second fluid channels. The first and second fluid channels may be arranged in alternating fashion, for example in a chequerboard configuration. The first fractal channel and second fractal channel may be directly connected to each alternating channel of the heat exchanger core. By forming the heat exchanger core as one, homogenous unit, it is less prone to vibration damage than if unsupported tubes were used for the channels.

Each of the plurality of first and second fluid channels in the heat exchanger core may have any cross section shape. For example, the channels may have a square, circular or diamond cross section. A diamond cross section is beneficial as it means that every surface will of each channel will form a primary transfer surface and thus increase the heat transfer within the core.

The cross-sectional area of each channel within the heat exchanger core may be equal. Alternatively, the cross-sectional area may differ, which can be accounted for by adjusting the wall thickness between each channel. Similarly, each channel may have the same cross-section shape, alternatively the cross-section shape may differ in each channel.

The first fractal channel and second fractal channel may comprise multiple fractal stages wherein each fractal stage may comprise at least one parent channel, a divergence point and a plurality of sub-channels. Within each fractal stage, each parent may channel splits into two or more sub-channels at the divergence point. The two or more sub-channels may diverge away from each other.

The two or more sub-channels may be rotationally symmetrical about the corresponding parent channel. For example, in a case where there are four sub-channels, each sub-channel may be offset by 90 degrees from neighbouring sub-channels.

The two or more sub-channels may diverge away from a central axis of the parent channel.

The sub-channels of each fractal stage may be shaped such that at least a portion of each sub-channel is parallel to a common axis The sub-channels of each fractal stage may be shaped so that a portion of the sub-channels are diverging away from the common axis. Each sub-channel of may form the parent channel of the next fractal stage. The sub-channels of each fractal stage may be distributed in a grid configuration.

The two or more sub-channels may have smaller diameters than the respective parent channel. A cross-sectional area of each parent channel may be equal to a total cross-sectional area of its corresponding sub-channels. This results in the overall cross-sectional area of the first fractal channel and the second fractal channel being constant along their respective length. This helps to prevent any significant pressure drops in the flow of the fluid.

Each channel of the heat exchanger core may have any shape cross section. For example the channels may be rectangular, square, circular, round or diamond shape.

The heat exchanger device may be for use with any required combination of fluids, such as liquid-liquid, liquid-gas or gas-gas heat exchange. The heat exchanger may be configured to use a liquid as the first fluid. The heat exchanger may be configured to use air as the second fluid for heating or cooling of the first fluid.

In some examples the heat exchanger is for aerospace use and an embodiment of the invention may provide an aircraft including the heat exchanger device described above. In context of aerospace use the first and second fluids could include any combination of two of: atmospheric air, cabin air, engine oil, generator oil, coolant, fuel and so on. Any combination of these fluids can be used within the same heat exchange deice, and it is not limited to two types of fluid. The fluid used depends on the requirements of the heat exchanger as different fluid will have different thermal and fluidic properties. Some fluid will move with a lower/higher velocity than others which may be preferable in certain situations to provide the necessary thermal transfer.

Viewed from a further aspect, there is provided a method for forming the heat exchanger with any of the features discussed above in connection with the first aspect.

The heat exchanger may be manufactured by a process of additive manufacturing as one piece.

The heat exchanger may be printed starting from the first fluid inlet to the second fluid inlet. The inclusion of through-channels at the point of the divergence points means that there are no unsupported surfaces. This allows for easy printing without the need for additional support structures.

Additive manufacturing allows for the complex configuration described by the first aspect of the invention to be manufactured quickly in one printed part.

BRIEF DESCRIPTION OF FIGURES

Embodiments of the present disclosure are described below by way of example only and with reference to the accompanying drawings, in which.

DETAILED DESCRIPTION OF FIGURES

Figure 1:
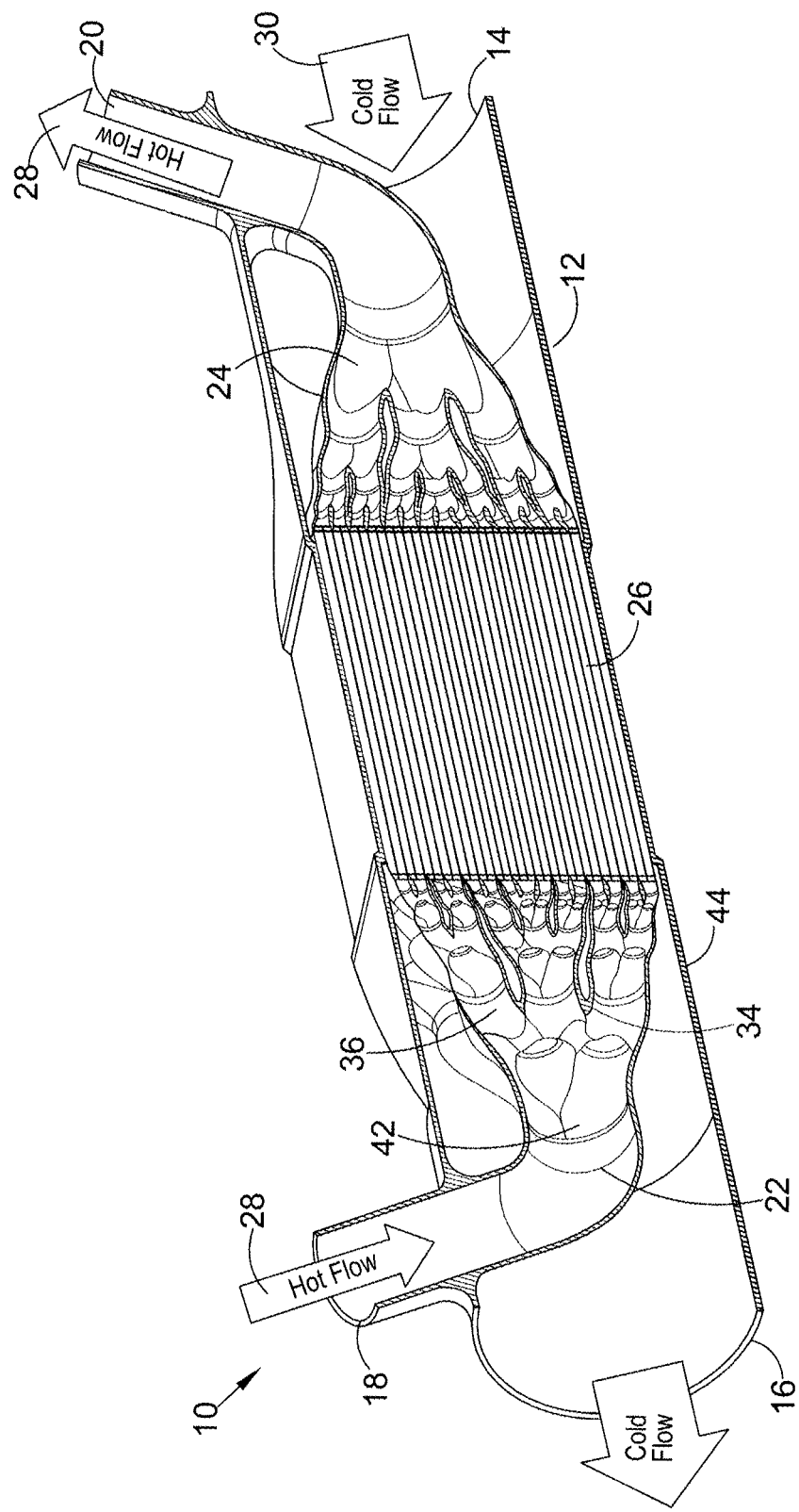
FIG. 1 shows a first heat exchanger.

FIG. 1 shows a first heat exchanger 10. The heat exchanger 10 is arranged to exchange thermal energy between a first fluid 28 and a second fluid 30, whilst preventing the first fluid 28 and second fluid 30 from mixing with one another.

The heat exchanger 10 comprises a body 12 defining a first second inlet 14 and a second fluid outlet 16. The body 12 conveys a second fluid 30 from the second fluid inlet 14 through a heat exchanger core 26 to the second fluid outlet 16. A first and second portion of the body 12 comprises an outer wall 44 which resembles a duct.

The heat exchanger core 26 in this embodiment comprises a single, solid construction defining a plurality of parallel channels in a close-packed configuration.

In the illustrated embodiment, the second fluid inlet 14 and second fluid outlet 16 are axially aligned with one another and are substantially equal in flow area. The body 12 is configured so as to allow the heat exchanger 10 to replace a section of a fluid duct, or the like, carrying the second fluid 30.

The heat exchanger 10 further comprises a first fluid inlet conduit 18 and a first fluid outlet conduit 20. The first fluid inlet conduit 18 and the first fluid outlet conduit 20 enter through the outer wall 44 of the body 12 of the heat exchanger 10 and pass through the flow of the second fluid 30.

The first fluid inlet conduit 18 leads into a first fractal channel 22 which is directly connected to a first end of the heat exchanger core 26 of the heat exchanger 10. A second end of the heat exchanger core 26 is directly connected to a second fractal channel 24 which leads to the first fluid outlet conduit 20. In the illustrated embodiment, the first fluid 28 and the second fluid 30 are supplied to the heat exchanger core 26 in a counter-current fashion. However, the fluid flow directions may alternatively be supplied to the heat-exchanger core 26 in a co-current fashion.

The term fractal channel here describes the repeatedly diverging structure of the channels 22, 24, whereby the channel 22, 24 repeatedly splits into two or more smaller sub-channels 36 along its length. Such structures are sometimes also known as multi-furcating channels.

Figure 2:
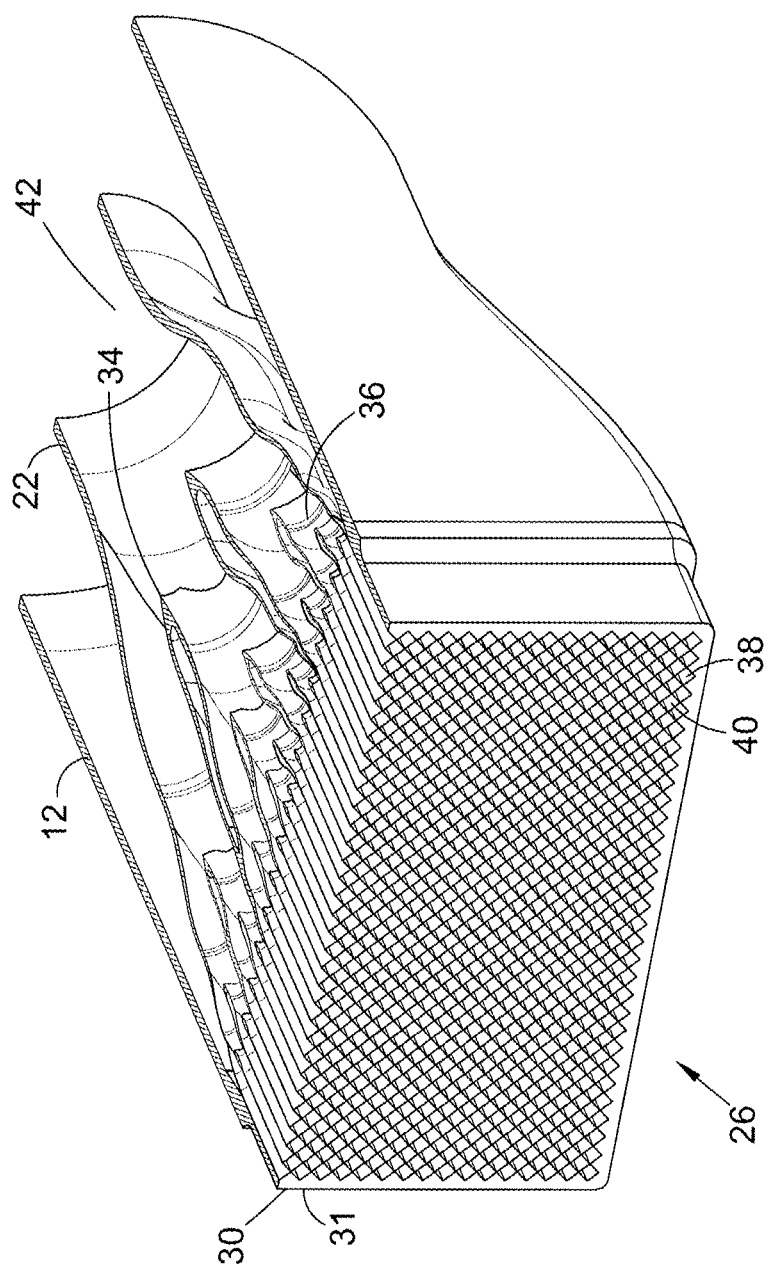
FIG. 2 shows a detailed cut-away view of a heat exchanger core of the first heat exchanger.

FIG. 2 shows a cut-away view of the first fractal channel 22 and the heat exchanger core 26. The second fractal channel 24 in FIG. 1 is a mirror of the structure of the first fractal channel 22, i.e. mirrored about a plane perpendicular to the flow direction of the fluid. In this embodiment, due to the symmetry of the structure, the structure of the second fractal channel 24 is identical to the structure of the first fractal channel 22, but oriented in reverse.

The first fractal channel 22 comprises a plurality of fractal stages.

The first fractal stage comprises a parent channel 42 with the largest diameter, corresponding to the diameter of the second fluid inlet conduit 18. The parent channel 42 of the first fractal stage reaches a first divergence point 34 where the parent channel 42 splits into nine sub-channels 36, the middle three of which are visible in the cut-away of FIG. 2, each having a smaller diameter than the parent channel 42. The outer sub-channels 36 initially diverge away from each other and a central axis of the parent channel 42, whilst the central sub-channel 36 continues along the central axis. The outer sub-channels 36 are curved such that after a given length the direction of the sub-channels become approximately parallel to the central axis of the parent channel 42.

The nine sub-channels 36 are arranged in a 3×3 grid and are 90 degrees rotationally symmetrical.

The nine sub-channels 36 split rotationally symmetrically from the parent channel 42, wherein each sub-channel 26 is offset by 90 degrees from neighbouring sub-channels 36.

Each sub-channel 36 then forms a parent channel in the next fractal stage. The second fractal stage of the fractal channel 22 thus comprises nine parent channels, corresponding to the nine sub-channels 36 of the first fractal stage. Each parent channel of the second fractal stage reaches a second divergence point 34 and splits into a plurality of additional sub-channels which diverge and curve in the same way as for the first fractal stage. These nine parent channels divide into 49 sub-channels arranged in a 7×7 grid.

The sub-channels 36 of the second fractal stage form parent channels of a third fractal stage, in which those parent channels diverge at a third divergence point 34 to form 225 sub-channels arranged in a 15×15 grid.

The sub-channels 36 of the third fractal stage subsequently form the fourth fractal stage which split in the same manner at a fourth divergence point to form 961 channels in a 31×31 grid.

The sub-channels 36 of the fourth fractal stage in the first fractal 22 are directly connected to alternative channels of the heat exchanger core 26. The sub-channels 36 of the fourth fractal stage in the second fractal channel 24 are directly, fluidly, connected to a second end of the heat exchanger core 26.

As discussed above, the structure of the second fractal channel 24 is identical to the structure of the first fractal channel 22.

Each sub-channel 36 is radially offset from the central axis of the corresponding parent channel 42.

The individual sub-channels 36 of each fractal stage have a smaller diameter than the respective parent channel of that fractal stage from which they have divided. The total cross sectional flow area of the sub-channels 36 within each particular fractal stage is substantially equal, therefore the total cross sectional flow area through the fractal channel 22 remains substantially constant. This prevents any pressure drop from occurring in the first fluid 28.

FIG. 2 also shows details of the heat exchanger core 26. In FIG. 2, the heat exchanger core 26 is of a single, solid, construction defining a plurality of parallel channels within it. The plurality of channels within the heat exchanger core 26 are closely packed so that the wall of one channel also forms at least a portion of the wall for adjacent channels. The plurality of parallel channels comprises a plurality of first fluid channels 38 and a plurality of second fluid channels 40. As the heat exchanger core 26 is a single, solid, construction it will be more resistant to vibration damage than a heat exchanger comprising unsupported or intermittently supported parallel tubes.

The second fluid channels 40 in the heat exchanger core 26 are supplied with the second fluid 30 at a first end of the heat exchanger core 26 from the second fluid inlet 14 of the body 12. The first fluid channels 38 are supplied with the first fluid 28 at a second end of the heat exchanger core 26 by the first fractal channel 22.

The second fluid 30 exits the heat exchanger core 26 at the second end and travels around the first fractal channel 22 to the first fluid outlet 16. The first fluid 28 exits the heat exchanger core 26 at the first end via the second fractal channel 24.

The heat exchanger core 26 comprises an approximately equal number of first fluid channels 38 and second fluid channels 40. In the illustrated example, the first fluid channels 38 are arranged in a 31×31 grid (i.e. with 961 first fluid channels 38), whilst the second fluid channels are arranged in a 30×30 grid (i.e. with 900 second fluid channels 40).

In the illustrated embodiment, the first and second channels 38, 40 within the heat exchanger core 26 each have a square diamond cross-sectional shape and are arranged in a grid configuration.

The first and second channels 38, 40 are arranged in an alternating fashion such that every side of each first channel 38 will act as a primary heat transfer surface with an adjacent second channel 40, and vice versa. It will be appreciated that any cross sectional shape can be used for the first and second channels 38, 40, for example the cross section of the channels 38, 40 may be diamond, rectangular, circular or any other shape. It is also possible for some of the channels 38, 40 to have different cross section shapes than other channels, this will however require different wall thicknesses to accommodate for it.

The total cross-sectional flow area of all the first fluid channels 40 is equal to the total cross-sectional flow area of both the first and second fractal channels 22, 24. This prevents pressure fluctuations in the first fluid 28.

The total cross-sectional flow area of the second fluid channels 38 is approximately equal to the total cross-sectional flow area of the first fluid channels 40. In the illustrated embodiment, this is less than the cross sectional flow area of the second fluid inlet 14 and second fluid outlet 16. However, if it is necessary to avoid pressure variations in the first fluid 28 as well as the second fluid 30, then the body 12 may be designed such that the total cross-sectional flow area of the first fluid channels 38 is approximately equal to the cross-sectional flow area of the second fluid inlet 14 and the second fluid outlet 16.

The heat exchanger core 26 is arranged so that all of the first fluid 28 and all of the second fluid 30 passes respectively through the first and second channels 38, 40 of the heat exchanger core 26.

The overall cross-section of the heat exchanger core 26 is rectangular, however it could be circular or any other cross section. Referring to FIG. 1, the first fluid inlet conduit 18 and the first fluid outlet conduit 20 extend through a side wall of the body 12 at an angle to the longitudinal direction of the duct 12. The angle between the ends of the second fluid inlet conduit 18 and the second fluid outlet conduit 20 is approximately 45 degrees, however it will be appreciated that the angle can be up to 90 degrees. The first fluid inlet conduit 18 is curved so that the first parent channel 42 is parallel to the longitudinal direction of the body 12.

Figure 3:
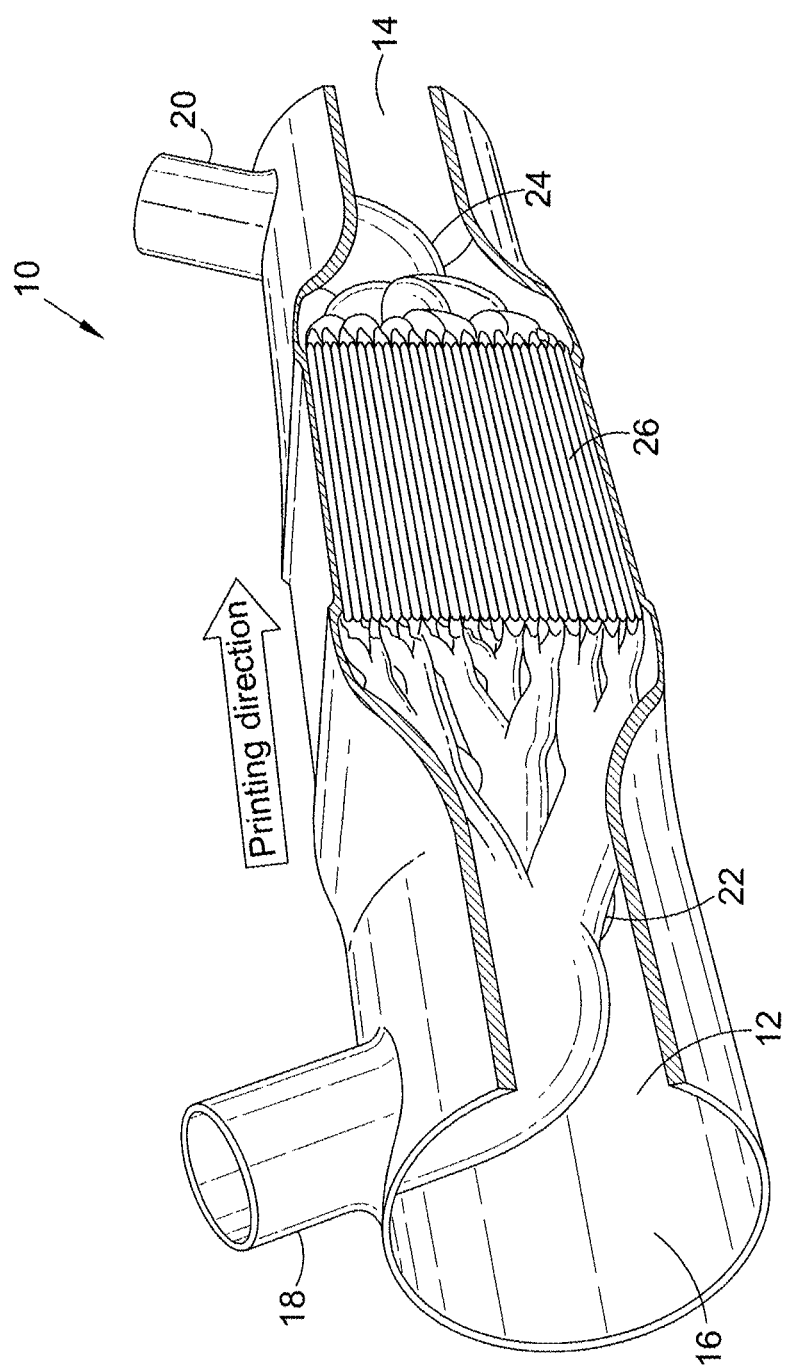
FIG. 3 shows how the first heat exchanger can be manufactured by additive manufacturing.

FIG. 3 shows how the heat exchanger 10 can be manufactured by additive manufacturing. The heat exchanger 10 can be manufactured using additive manufacturing as one piece.

The heat exchanger 10 is shown in FIG. 3 as being printed from the second fluid outlet 16 to the second fluid inlet 14, wherein the second fluid outlet 16 forms the bottom surface during printing. Therefore for the first fractal channel 22 (closest to the bottom surface) the first parent channel 42 will be printed first ending with the smallest sub-channel 36. For the second fractal channel 24 (nearest to the top surface) the smallest sub-channels 36 will be printed first ending with the first parent channel 42.

With reference to FIG. 2, and considering the printing direction it will be appreciated that the second (top) fractal channel 24 will be fully supported, however, when printing the first (bottom) fractal channel 22, each divergence point 34 will be unsupported. There would therefore be a need to provide additional supporting structures which will reduce the speed of manufacture as well as increase costs.

FIGS. 4 to 7 show a second heat exchanger 10, which has been found to improve second fluid flow around the fractal channels 22, 24 and also to simplify the additive manufacturing process.

The structure of the second heat exchanger 10 is similar to that of the first heat exchanger 10. Accordingly, only the differences between the heat exchangers will be discussed. Components of the second heat exchanger 10 that are similar to those of the first heat exchanger 10 are labelled with the same reference sign, and will not be described again.

Figure 4:
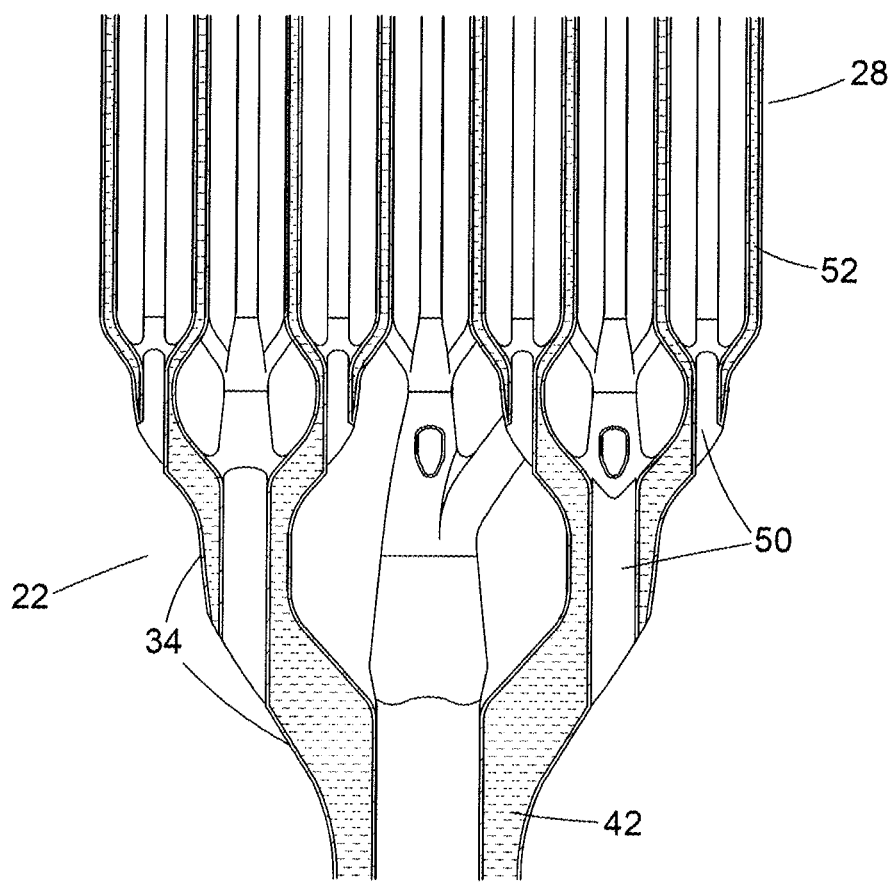
FIG. 4 shows a cut-away view of a first fractal channel and heat exchanger core for a second heat exchanger.

FIG. 4 shows a first fractal channel 22 for the second heat exchanger 10, where a bypass tube 50 is provided at each divergence of the fractal channel 22.

Within each fractal stage, each parent channel and sub-channel includes a bypass tube 50 which extends in the longitudinal direction of the heat exchanger 10. Each bypass tube 50 is axially aligned with a parent channel of the first fractal channel 24. Each bypass tube 50 extends between an outer surface of a parent channel along the length of the parent channel to where the divergence point 34 was previously, where it emerges between the sub-channels after divergence. The outer surface of the parent channel from which the bypass tube 50 extends is the point at which the parent channel curves inward from the previous diversion, i.e. where the sub-channels of the preceding fractal stage change from diverging away from the central axis of the parent channel 42 to being parallel to the central axis of the parent channel 42.

As can be seen in FIG. 4, during the printing process the divergence points 34 that were previously unsupported have now been replaced by a bypass tube 50 such that the first fractal channel 22 will be fully supported.

Figure 5:
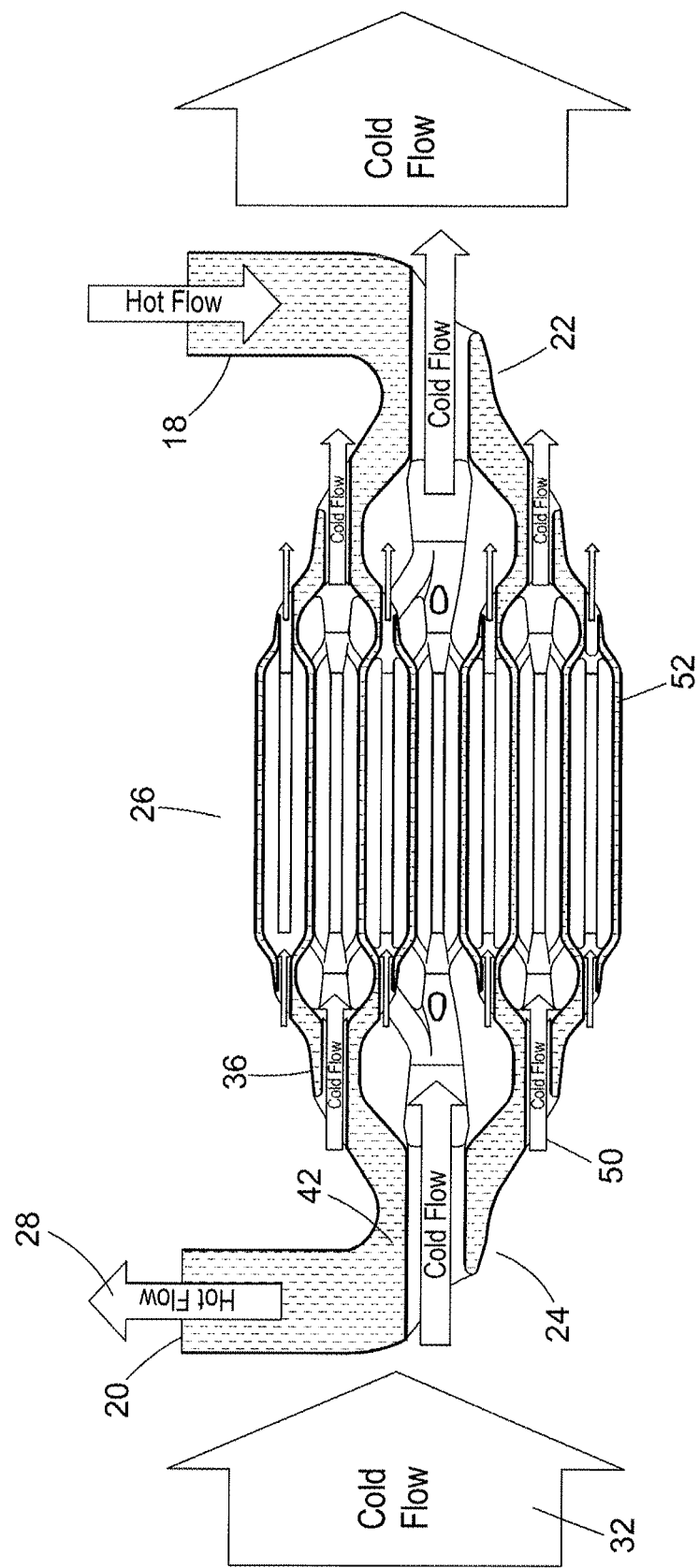
FIG. 5 shows a cut-away of the fractal channel, the heat exchanger core and a second fractal channel of the second heat exchanger.
Figure 6:
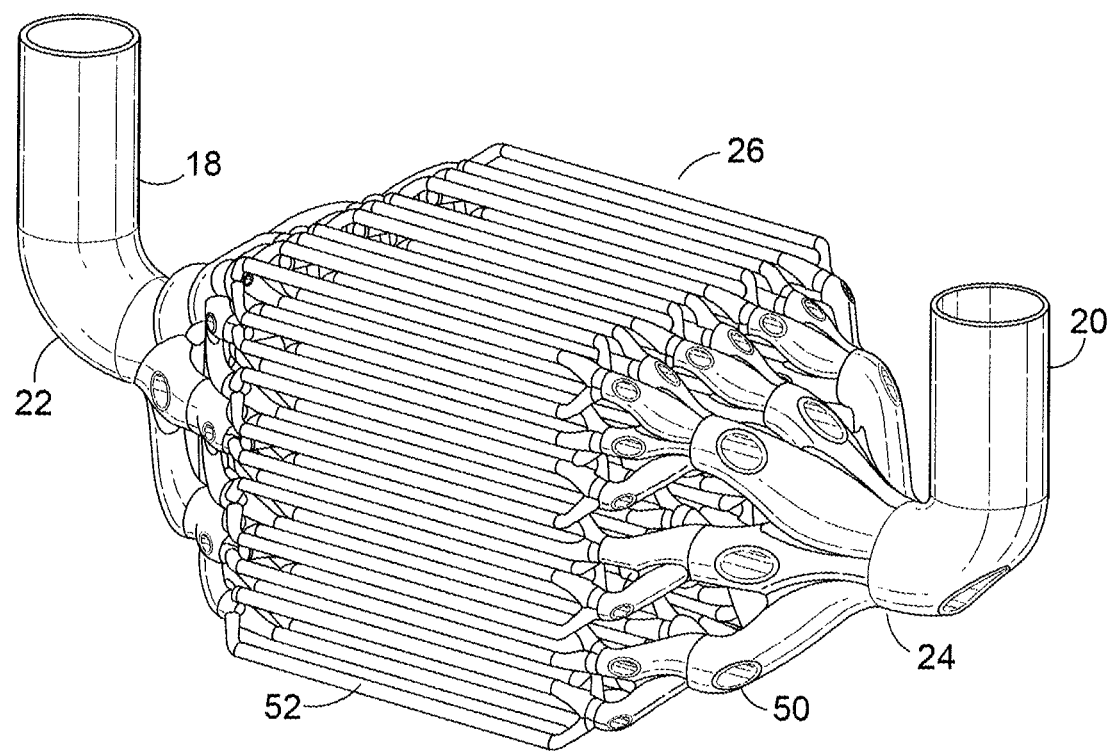
FIG. 6 shows an isometric view of the fractal channel, heat exchanger core and second fractal channel of the heat exchanger.

Referring to FIGS. 5 and 6, the second heat exchanger core 26 comprises a plurality of first fluid tubes 52 which extend between the smallest sub-channels 36 of the first fractal 22 to the smallest sub-channels of the second fractal 24.

The fractal channels 22, 24 and first fluid tubes 52 of the heat exchanger core 26 can be used to transport a first fluid 28 and the space surrounding the fractal channels 22, 24 and plurality of fluid tubes 52 of the heat exchanger core 26 can be filled with the second fluid 30.

Referring to FIGS. 1 and 5, in use, both of the first and second heat exchangers 10 use counter flow heat exchange so the first fluid 28 and the second fluid 30 travel in opposite directions. The second fluid 30 enters the heat exchanger 10 at the second fluid inlet 14. The second fluid 30 flows around the second fractal 22, containing the first fluid 28, and also through the bypass tubes 50.

The second fluid 30 then enters the heat exchanger core 26 at a first end. In FIG. 1 where the heat exchanger core is a single, solid, construction of closely-packed tubes the second fluid 30 travels through the second fluid channels 38 of the heat exchanger core 26 and leaves via the second end of the heat exchanger core 26. In FIG. 5 where the heat exchanger core 26 comprises a plurality of discrete first fluid tubes 52 connecting the smallest sub-channels 36 of the first fractal channel 22 and second fractal channel 24, the second fluid 30 travels around the first fluid tubes 52. The second fluid 30 then leaves the second heat exchanger 10 at the second fluid outlet 16.

The first fluid 28 enters the heat exchanger 10 via the first fluid inlet conduit 18 at an angle to the longitudinal direction off the duct 12. The first fluid 28 then travels through the first fractal channel 22 and, in the case of FIGS. 1 to 3 enters the first fluid channels 38 at the second end of the heat exchanger core 26. In FIG. 5 the first fluid 28 travels through the first fractal channel 22 and enter the plurality of first fluid tubes 52. The first fluid 28 travels along the first fluid channels 38 or the first fluid tubes 52 of the heat exchanger core 26 and then enters the second fractal channel 24. The first fluid 28 then exits the heat exchanger 10 via the first fluid outlet conduit 20.

The first and second fractal channels 22, 24 are positioned within the body 12 and hence the fractal channels 22, 24 are submerged in the flow path of the second fluid 30. This means that heat transfer will take place between the first and second fluids 28, 30 as they pass around and through the fractal channels 22, 24, respectively, as well as when they flow through the heat exchanger core 26.

Furthermore, the addition of the bypass tubes 50 allows the second fluid to reach the middle of each sub-channel in the fractal channels 22, 24 and thus the distribution of the second fluid is much more uniform. The bypass tubes 50 also mean that the primary heat transfer surface area is increased.

The bypass tubes 50 are therefore advantageous in that they improve the working efficiency of the heat exchanger, in addition to improving the additive manufacturing process.

The heat exchanger utilizes counter flow, although parallel flow can also be utilized where the first fluid flow and the second fluid flow are in the same direction.

The counter flow arrangement means that the temperature difference will be more uniform along the length of the heat exchanger core 26 than if parallel flow is utilised. This prevents the hottest fluid from being in contact with the coldest fluid and hence reduces the thermal stresses on the thin channels and walls of the fractal channels 22, 24.

In cases where the heat exchanger core 26 comprises a plurality of loosely-packed fluid tubes 52, such as in the second heat exchanger 10 shown in FIGS. 4 to 7, cross-flow heat exchange can also be utilised.

Figure 7:
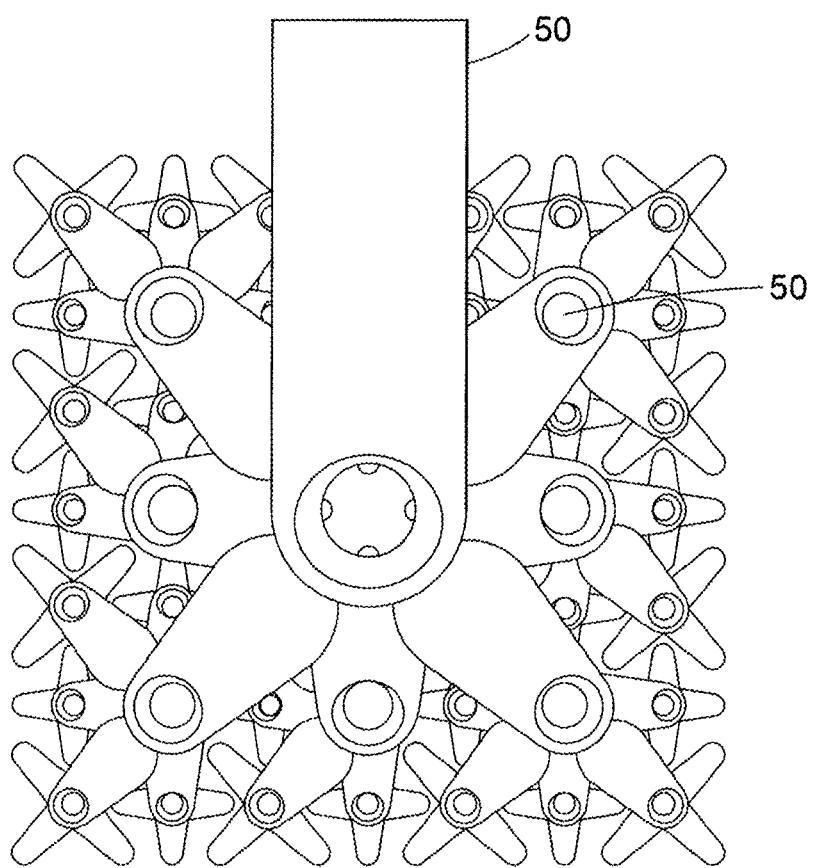
FIG. 7 shows an end view of the first fractal channel of the second heat exchanger.

FIG. 6 shows an isometric view of a first fluid circuit of the second heat exchanger 10 and FIG. 7 shows an end view of the first fractal channel 22 of the second heat exchanger 10.

In the second heat exchanger 10, the first parent channel 42 of the first fractal heat exchanger 22 splits into 8 sub-channels 36 in a first fractal stage. The parent channel 42 comprises a bypass tube 50 which extends from one surface of the parent channel 42 in a longitudinal direction, parallel to the second fluid flow path, through to the first divergence point 34. Each of the eight sub-channels 36 also comprise bypass tubes 50 which extend from one surface of the sub-channel in a longitudinal direction, parallel to the second fluid flow path, through to the next divergence point 34. As shown in FIG. 7, the bypass tube 50 provides a clear path for the second fluid 30 to travel through.

Each of the 8 sub-channels forms a parent channel for a second fractal stage. Within the second fractal stage, each of the 8 parent channels divide into a further 5 sub-channels resulting in 40 sub-channels in the second fractal stage.

The distribution of the 5 sub-channels around each corresponding parent channel is rotated by 90 degrees for every two groups of sub-channels about the fractal channel. For example, considering FIG. 7, the parent channel in the top left splits into 5 sub-channels whereby two of the sub-channels are located on the same horizontal plane as the parent channel and three sub-channels are located on a horizontal plane above the plane of the parent channel. For parent channel in the top-middle, two sub-channels are located on the same vertical plane as the corresponding parent channel and three sub-channels are located on a vertical plane to the right of the corresponding parent channel. As such the distribution of sub-channels has shifted by 90 degrees in the clockwise direction. The sub-channels of the second fractal stage therefore maintain 90° rotational symmetry.

The 40 sub-channels of the second fractal stage subsequently form the parent channels for a third fractal stage. The parent channels of the third fractal stage each split into four sub-channels, thus forming 160 sub-channels. The 160 sub-channels then extend straight as fluid tubes 52 to the 256 sub-channels of the second fractal channel 24.

The arrangement of sub-channels discussed above is one of many possible arrangements that would be possible.

The bypass tubes 50 have thus far only been described in conjunction with the first fractal channel 22 of the second heat exchanger 10 shown in the FIG. 4-7. It will be appreciated that the same construction may be applied to the second fractal channel 24 of the second heat exchanger 10. Furthermore, bypass tubes 50 may be incorporated into the fractal channels 22, 24 used for the first heat exchanger 10, i.e. comprising a heat exchanger core 26 formed of a single, solid construction defining a plurality of parallel channels in a close-packed configuration.

As discussed above the heat exchanger 10 can be manufactured by additive manufacturing. This allows for the shape of the heat exchanger to be adapted according to accommodate existing systems.

The heat exchanger 10 can be printed by additive manufacture from any material suitable for the intended operating conditions. The type of material depends on the specific application of the heat exchanger 10.

Exemplary materials that may be used are aluminium, steel, nickel, alloys or titanium or superalloys such as Inconel 625. Aluminium may be suitable for low to medium temperature applications. Polymers may be suitable for low temperature applications. Polymers may also be used if it is desirable for the heat exchanger to be flexible.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A heat exchanger comprising:
   a plurality of first fluid channels defining a flow path for a first fluid;
   a first fractal channel for conveying the first fluid to the plurality of first fluid channels; and
   a second fractal channel for conveying the first fluid from the plurality of first fluid channels;
   wherein the first fractal channel and the second fractal channel each comprises at least one divergence point along its length where a parent channel splits into a plurality of sub-channels which diverge away from each other, and
   wherein one or each of the first fractal channel and the second fractal channel defines one or more through-channels for a second fluid to pass through the respective fractal channel, each through-channel extending from a parent channel side of a divergence point and emerging between the corresponding sub-channels on a sub-channel side of the divergence point.

2. The heat exchanger according to claim 1, wherein the first fractal channel and the second fractal channel each comprises a plurality of fractal stages wherein each fractal stage comprises at least one parent channel, a divergence point and a plurality of sub-channels, and wherein the plurality of sub-channels of one fractal stage form parent channels of a subsequent fractal stage.

3. The heat exchanger according to claim 2, wherein the sub-channels of each fractal stage are distributed in a grid configuration.

4. The heat exchanger according to claim 2, wherein the sub-channels of each fractal stage are shaped such that at least a portion of each sub-channel is parallel to a common axis.

5. The heat exchanger according to claim 1, wherein a cross-sectional area of each parent channel is equal to a total cross-sectional area of its corresponding sub-channels.

6. The heat exchanger according to claim 1, wherein each through-channel is axially aligned with at least a portion of the parent channel.

7. The heat exchanger according to claim 1, wherein a through-channel is provided for each parent channel at each divergence point of the first fractal channel and the second fractal channel.

8. The heat exchanger according to claim 1, wherein the plurality of first fluid channels are a plurality of discrete tubes directly connected to the first fractal channel and the second fractal channel.

9. A heat exchanger according to claim 1, comprising a heat exchanger core including the plurality of first fluid channels and a plurality of second fluid channels defining a flow path for the second fluid.

10. The heat exchanger according to claim 9, wherein the heat exchanger comprises a homogeneous block of material having a plurality of bores extending therethrough defining the plurality of first fluid channels and second fluid channels, optionally wherein the first fluid channels and the second fluid channels are arranged in an alternating fashion.

11. The heat exchanger according to claim 9, wherein the plurality of channels in the heat exchanger core each have a diamond-shaped cross-section.

12. The heat exchanger according to claim 1, further comprising an outer wall defining a second fluid inlet and a second fluid outlet for a second fluid to flow through the heat exchanger and exchange heat with the plurality of first fluid channels, wherein the fluid inlet and the fluid outlet are axially aligned with each other along a longitudinal axis of the heat exchanger.

13. The heat exchanger according to claim 12, further comprising:
   a first fluid inlet conduit connected to the first fractal channel; and
   a first fluid outlet conduit connected to the second fractal channel, the first fluid inlet and outlet conduits both extending through the outer wall.

14. A heat exchanger according to claim 13, wherein the fluid inlet conduit and the fluid outlet conduit are at an angle of between 45 and 90 degrees with respect to a longitudinal axis the heat exchanger.

15. A method comprising:
   manufacturing a heat exchanger according claim 1 by a process of additive manufacturing as one piece.

* * * * *